United States Patent
Wickham et al.

(10) Patent No.: US 7,059,055 B2
(45) Date of Patent: Jun. 13, 2006

(54) HIGH OUTPUT DEVICE FOR CONFIRMING THREAD PRESENCE IN NUTS AND OTHER THREADED PARTS

(75) Inventors: John L. Wickham, Glen Arm, MD (US); James L. Brun, Forest Hill, MD (US); Robert K. Paquin, Baltimore, MD (US)

(73) Assignee: New Vista Corporation, Baltimore, MD (US)

( * ) Notice: Subject to any disclaimer, the term of this patent is extended or adjusted under 35 U.S.C. 154(b) by 0 days.

(21) Appl. No.: 10/953,426

(22) Filed: Sep. 29, 2004

(65) Prior Publication Data

US 2006/0005405 A1    Jan. 12, 2006

Related U.S. Application Data

(60) Provisional application No. 60/507,165, filed on Sep. 30, 2003.

(51) Int. Cl.
    *G01B 3/48* (2006.01)
(52) U.S. Cl. .................................... 33/199 R
(58) Field of Classification Search ............. 33/199 B, 33/199 R, 542, 543, 545; 209/509, 619; 73/761
    See application file for complete search history.

(56) References Cited

U.S. PATENT DOCUMENTS

| | | | | |
|---|---|---|---|---|
| 1,954,852 A | * | 4/1934 | Thomson ................... | 33/199 R |
| 2,602,347 A | * | 7/1952 | Miller ...................... | 33/199 R |
| 3,044,178 A | * | 7/1962 | Kasten et al. ............. | 33/199 R |
| 3,369,302 A | * | 2/1968 | Johnson .................... | 33/199 R |
| 3,539,006 A | * | 11/1970 | Pajak et al. ................. | 209/567 |
| 3,872,602 A | * | 3/1975 | Kennedy et al. .......... | 33/199 R |
| 4,519,144 A | * | 5/1985 | Larsen ..................... | 33/199 R |
| 4,926,700 A | * | 5/1990 | Peplinski .................... | 73/761 |
| 5,131,162 A | * | 7/1992 | Miller ...................... | 33/199 R |
| 5,823,356 A | * | 10/1998 | Goodrich et al. .......... | 209/601 |

* cited by examiner

Primary Examiner—G. Bradley Bennett
(74) Attorney, Agent, or Firm—Armstrong, Kratz, Quintos, Hanson & Brooks, LLP

(57) ABSTRACT

A device for confirming the presence of thread in nuts and other threaded parts has a threaded gage mounted on a holder which is connected through a clutch to a motor. The motor drives the holder to rotate the threaded gage to engage the threaded part. Switches are provided to stop and reverse the motor. The device identifies parts without threads and also damaged and incomplete threads. The device does not impart undue force levels to unthreaded, undersized parts or defective parts. The device confirms threads in threaded blind bores.

26 Claims, 11 Drawing Sheets

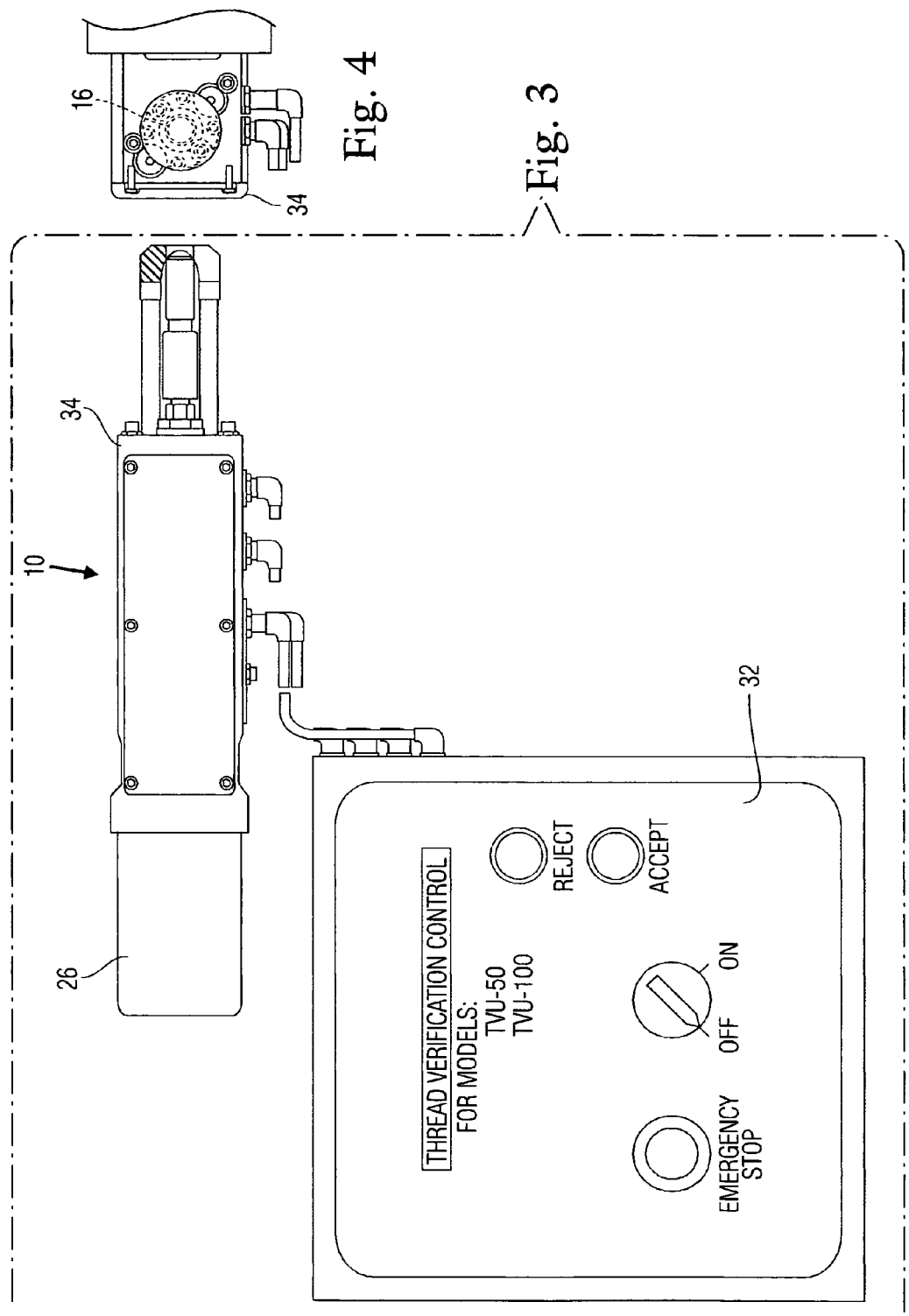

HIGH OUTPUT DEVICE FOR CONFIRMING THREAD PRESENCE IN NUTS AND OTHER THREADED PARTS

CROSS REFERENCE TO RELATED APPLICATIONS

This application is related to provisional patent application Ser. No. 60/507,165 filed Sep. 30, 2003, the contents of which are incorporated by reference in their entirety.

BACKGROUND OF THE INVENTION

1. Field of the Invention

The present invention relates to a device to control and check the quality of threaded parts, and more particularly to a high output device which automatically checks the threads in and on threaded parts.

2. Description of Related Art

In the production of high volume threaded parts, it is important to be sure that all parts are properly threaded. Many of these parts are used in assemblies where the fasteners are driven with automatic equipment. Even one unthreaded part in 10,000 can cause expensive downtime.

Up until now, nearly all thread confirming (or thread acceptance gauging) has been done by hand, on a sampling basis. For example, if 24,000 nuts are being produced an hour, then one out of every 1,000 might be checked, or 24 pieces in the one-hour period. This practice has proven inadequate, however. It is very easy for the tap (or other thread-forming device) to become broken, or worn, or not engage far enough; or for dirt or metal scrap to lodge in the threads. Sampling can't catch all these problems all of the time.

In U.S. Pat. No. 3,539,006, Hamna et al disclose a method and apparatus for inspecting annular articles such as nuts. A pair of unthreaded probes are used to check the diameter of the opening. Peplinski in U.S. Pat. No. 4,926,700 discloses an apparatus to test whether a threaded blind bore has been properly formed. Torque on a nut driver is measured. Also an electrical contact point on a driver portion indicates when the test plug has reached a desired depth in the test piece. In U.S. Pat. No. 5,823,356, Goodrich et al disclose an apparatus for inspecting threaded members. A constant speed rotary threaded fastener is engaged by a master thread gage for a predetermined amount of time to indicate acceptability of the fastener.

SUMMARY OF THE INVENTION

It is an object of the present invention to provide an automatic device which can very rapidly test every threaded part of a production run.

It is a further object of the present invention to examine threaded items to detect imperfect threads and non-threaded parts and prevent shut-down of a production line.

In accordance with the teachings of the present invention, there is disclosed a device for confirming thread presence in nuts and other threaded parts. The device has a threaded gage mounted on a holder. The holder is mounted on a first end of a spindle. The spindle is connected, through a clutch, to a fast reversing motor. The motor very rapidly forwardly drives the spindle to rotate the threaded gage to cooperate with and engage the aligned threaded part, the motor being very rapidly reversed to retract the threaded gage.

In further accordance with the teachings of the present invention, there is disclosed a device for confirming thread presence on a threaded part. A threaded gage is connected to a motor through a clutch. The clutch has two portions, a slip portion for forward drive engagement of the threaded gage with the threaded part and a direct drive portion for reverse drive disengagement of the threaded gage from the threaded part.

In still further accordance with the teachings of the present invention, there is disclosed a device for confirming thread presence in a part having a threaded blind bore. A threaded gage is mounted on a holder. The holder is mounted on a first end of a spindle, the spindle being connected, through a clutch, to a fast reversing motor. The motor very rapidly forwardly drives the spindle to rotate the threaded gage to cooperate with and engage the aligned threaded blind bore. A stall plate is formed within the device wherein the clutch is moved into contact with the stall plate stopping the threaded gage and preventing jamming of the threaded gage within the thread blind bore.

These and other objects of the present invention will become apparent from a reading of the following specification taken in conjunction with the enclosed drawings.

BRIEF DESCRIPTION OF THE DRAWINGS

FIG. 3 is a side elevation view of another embodiment of the present invention shown in a housing connected to a control.

FIG. 4 is an end view of FIG. 3.

DESCRIPTION OF THE PREFERRED EMBODIMENTS

Figure 1:
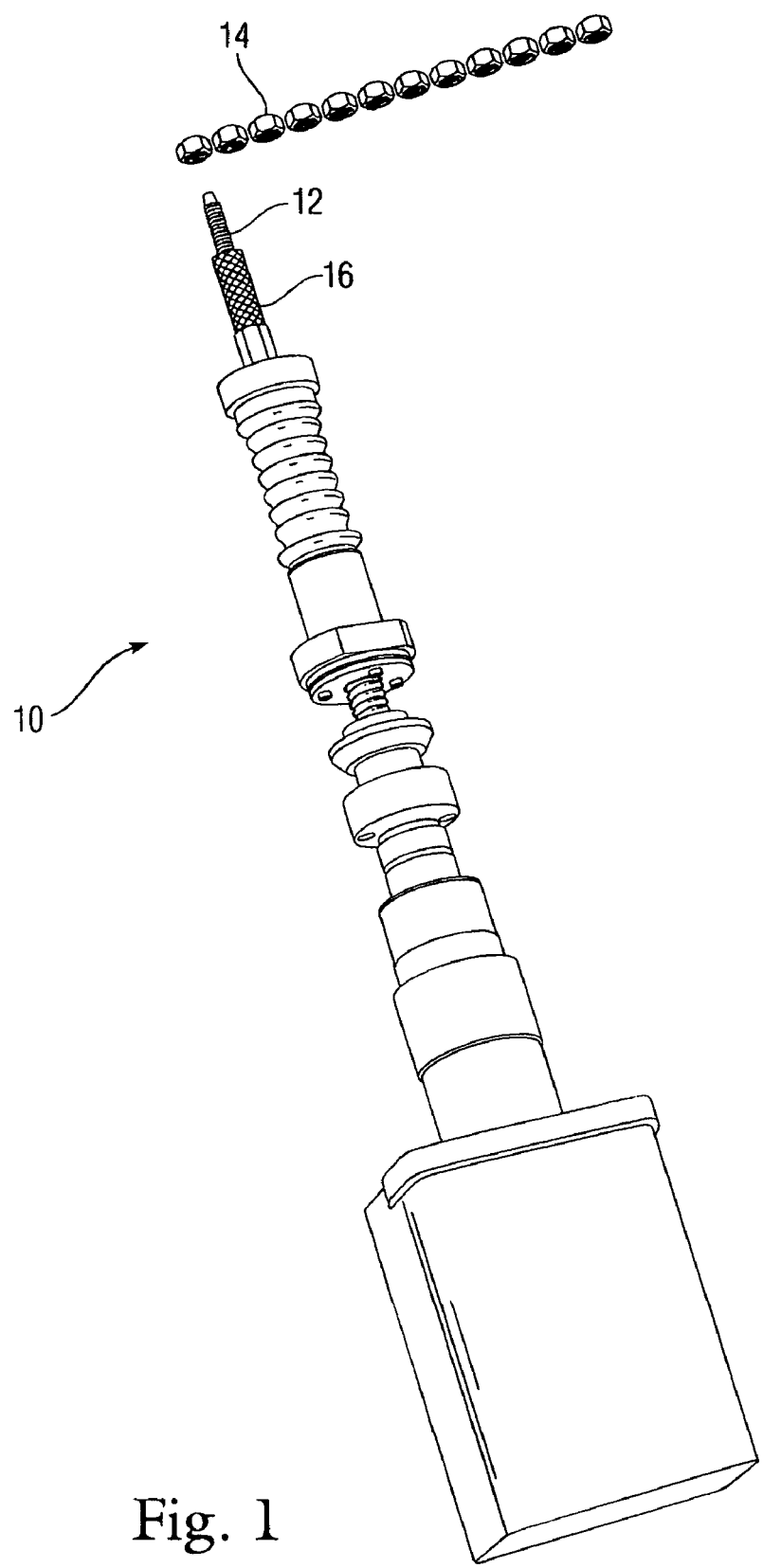
FIG. 1 is a perspective view of one embodiment of the device of the present invention shown without a housing.
Figure 2:
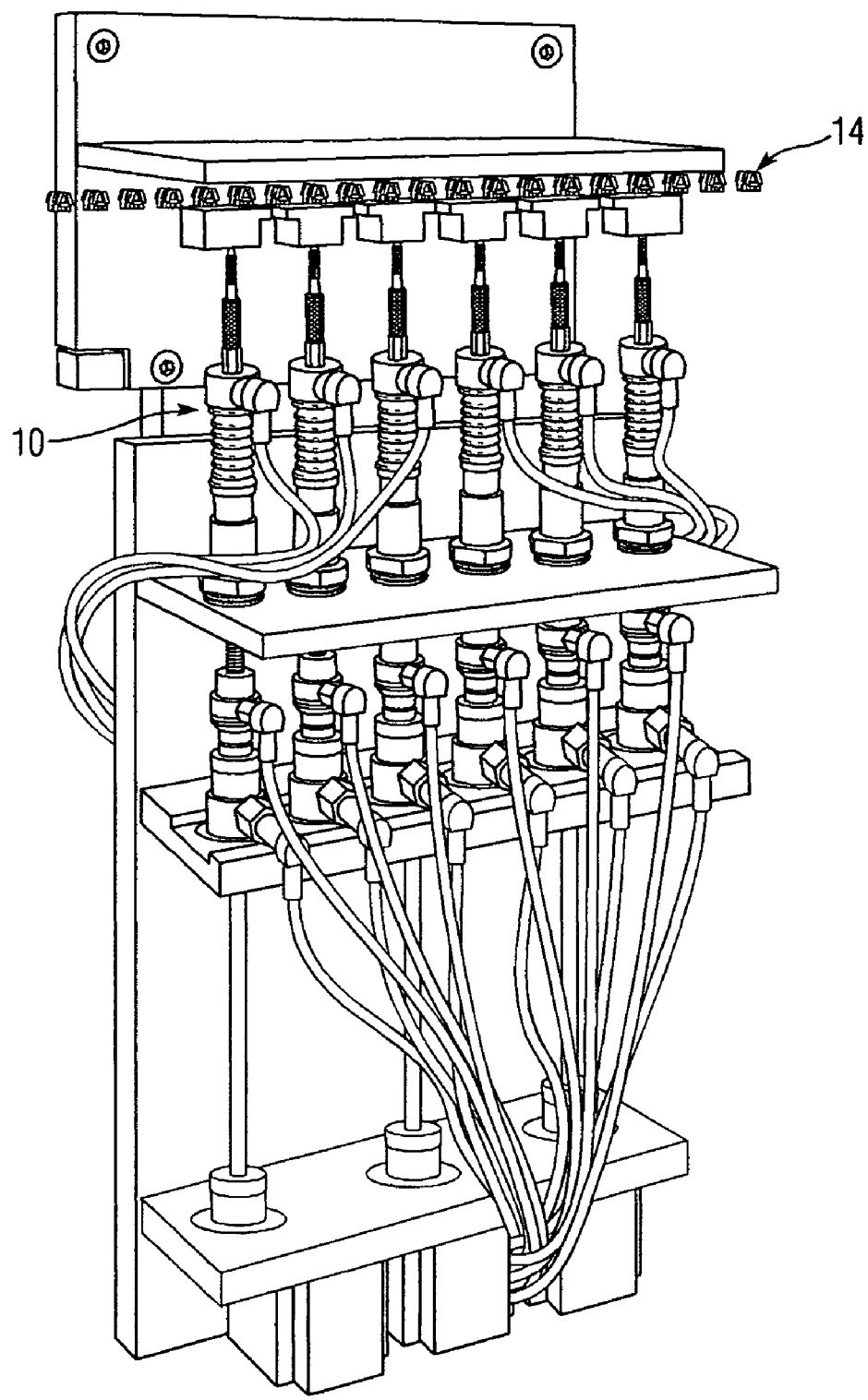
FIG. 2 is a perspective view of a bank of six of the devices of FIG. 1 for high volume production.
Figure 5:
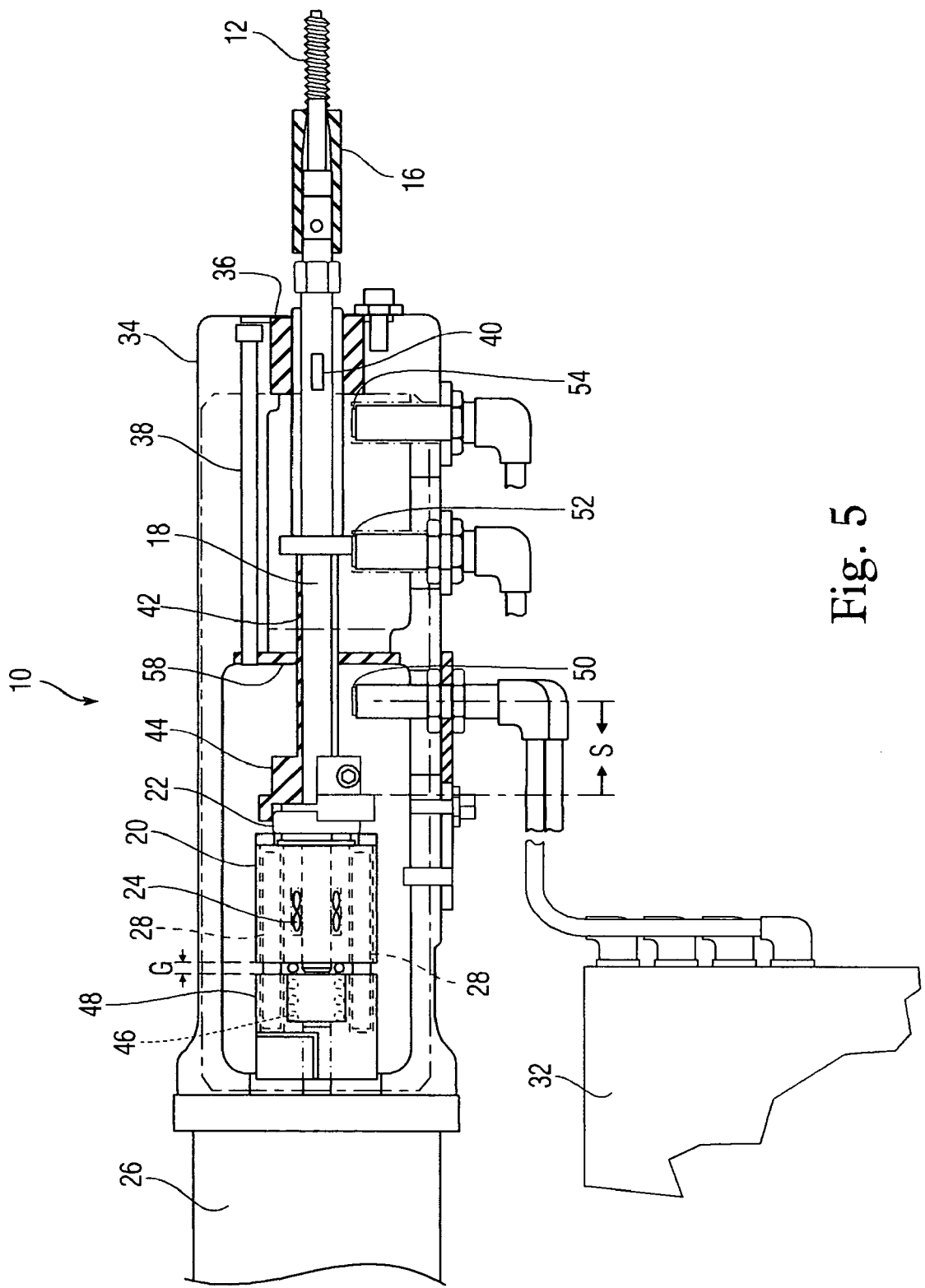
FIG. 5 is a partial cross-section view of FIG. 3 showing the device in the initial start position.
Figure 6:
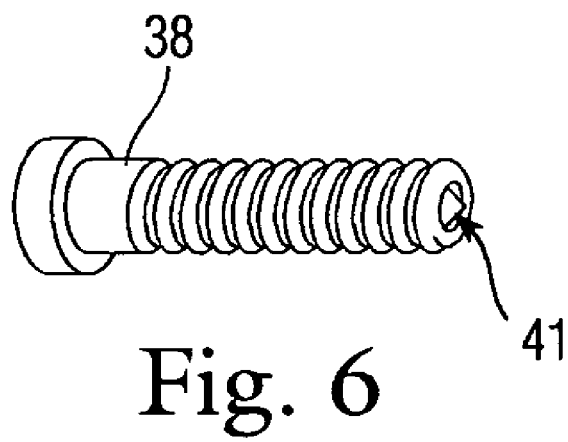
FIG. 6 is a perspective view of the lead screw.

Referring now to FIGS. 1–5, at one end of the device 10, there is a threaded gage 12 which has threads of a selected size to cooperate with a threaded part 14 which is to be checked. The threaded part 14 may have internal threads (such as a nut) or external threads (such as a bolt). The threaded gage 12 is the inverse of the threaded part 14. The threaded gage 12 is removable being held in a collet holder 16. In this manner, the threaded gage 12 of the desired size can be used. The collet holder 16 is connected to an output spindle 18 which drives the threaded gage 12. The output spindle 18 is in turn driven by a clutch 20. It is preferred that the output spindle 18 extend through a center opening in the clutch 20. The clutch 20 has a slip portion 22 and a direct drive portion 24 as shown in FIG. 6. When the threaded gage is being engaged with the threaded part 14, the clutch acts as a slip device. When the threaded gage 14 is being backed away from the threaded part 14, the clutch 20 acts as a direct drive. The clutch 20, in turn is driven by a fast reversing motor 26. A slip joint such as at least a pair of drive pins 28 slidably connects the clutch 20 to the motor 26. Other slip joints may be used. The motor may be an electric servo motor, an air motor or any type known to persons skilled in the art. The motor must have a high torque.

Alternately, the output spindle 18 is urged by a resilient means such as a spring or a fluid. The spindle may be driven by air while disengagement (withdrawal) is provided by a spring.

The threaded gage 12 is aligned with the threaded part 14 and the motor 26 drives the clutch 20 to turn the spindle 18. There are three possible scenarios: 1) If the threaded part 14 is properly threaded, the threaded gage 12 completely engages the threaded part 14; 2) In the event that there is an obstruction on the threaded part 14 or the threads are defective, the threaded gage 12 cannot fully engage the threaded part 14; 3) If the threaded part 14 has no threads or is undersized, the threaded gage 12 will turn without engaging the threaded part 14.

A housing 34 is provided for the device 10 with the threaded gage 12, the collet holder 16 and one end of the spindle 18 being external of the housing 34. An internally threaded lead nut 36 is secured in the housing 34 adjacent to the collet holder 16. The lead nut 36 has a central through opening through which the spindle 18 passes with clearance. A hollow lead screw 38 is received on the spindle 18. The lead screw 38 has external threads which cooperate with the internal threads in the lead nut 36. A key 40 is formed in the spindle 18 with a corresponding keyway 41 in the lead screw 38 such that rotation of the spindle 18 produces axially movement of the lead screw 38 with respect to the spindle 18. A hollow tube 42 is disposed around the spindle 18, abutting the lead screw 38 and extending to a clamp ring 44 which holds the slip clutch 22 on the spindle 18. An urging spring 46 is disposed in a driver 48 which is connected to the motor 26. The urging spring 46 contacts the end of the spindle 18 which extends out of the clutch 20 and urges the spindle 18 toward the threaded gage 12. Pushing inwardly against the threaded gage 12 moves the spindle 18 axially against the urging spring 46 and opens a gap between the hollow tube 42 and the lead screw 38 or between the hollow tube 42 and the clamp ring 44.

Considering the first scenario, means are provided to indicate whether engagement between the threaded gage 12 and the threaded part 14 are complete. In one embodiment, (FIG. 7) with the threaded gage 12 in the collet holder 16 on the spindle 18, when the motor 26 is activated, the spindle 18 rotates and the threaded gage 12 is directed to engage the threaded part 14. The lead screw 38 advances axially toward the threaded gage 12 with the hollow tube 42 immediately adjacent to the lead screw 38. The gap G between the driver 48 and the clutch 20 increases and the space S between the clamp ring 44 and the first limit switch 50 decreases. When there is no space S remaining, the first limit switch 50 is activated. An electric signal is transmitted to control 32 which stops the forward drive of the motor 20 and reverses the motor 26. The spindle 18 is restarted in a reverse direction and the threaded gage 12 is withdrawn from the threaded part 14. As the motor 26 rotates the spindle 18 in the reverse direction, the gap G decreases and the space S increases until both are at the starting point. A second limit switch 52 is disposed opposite the position where the inner end of the lead screw 38 is normally located (nearer the clutch) when the device 10 is at the starting point. The second limit switch 52 is actuated when the motor 20 has reversed the spindle 18 and the lead screw 38 has reversed to this position. The second limit switch 52 sends a signal to the control 52 to stop the motor 26 and limit the reversal.

Figure 9:
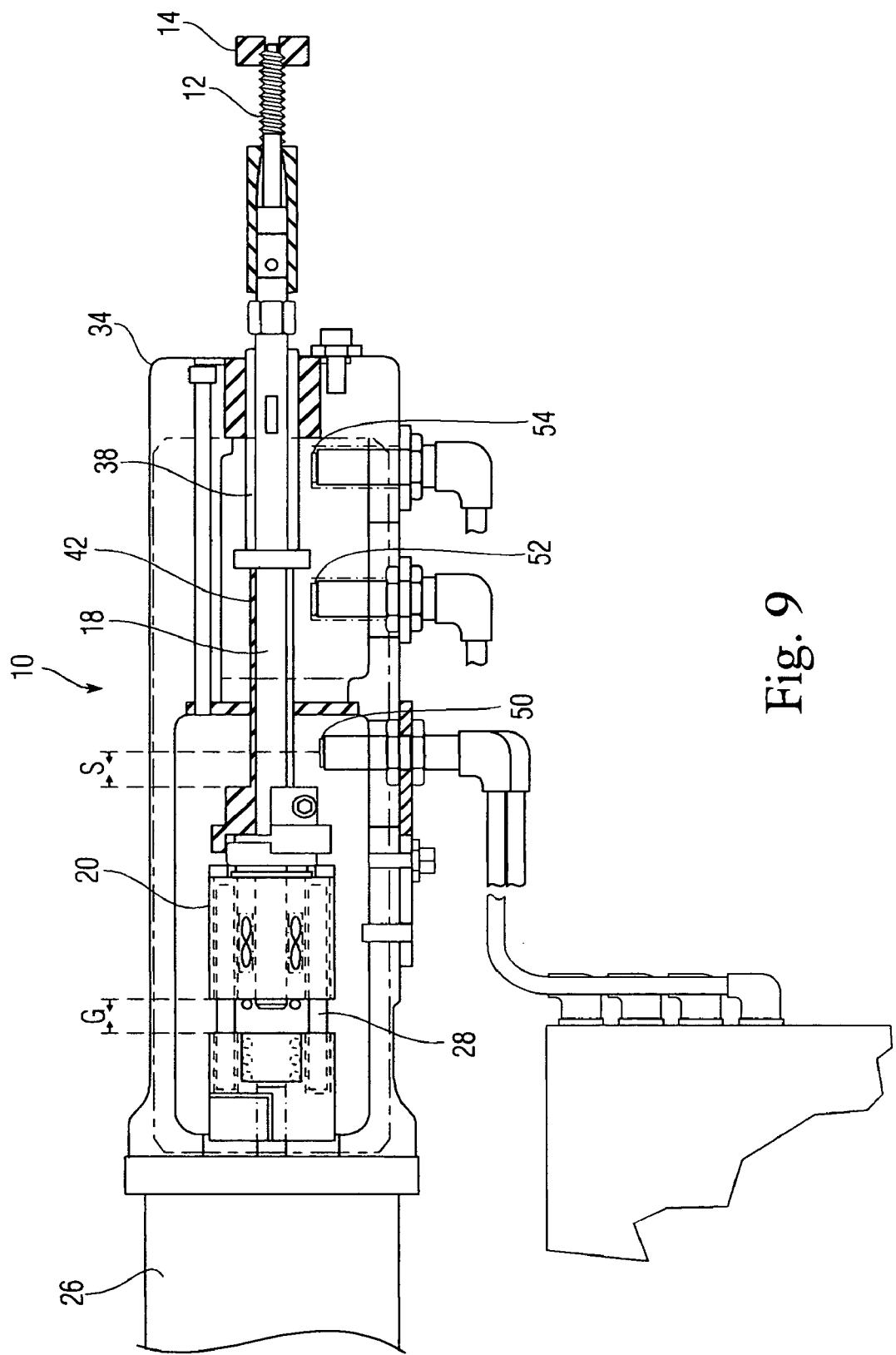
FIG. 9 is a partial cross-sectional view of the device showing the threaded gage engaging a damaged threaded part.
Figure 10:
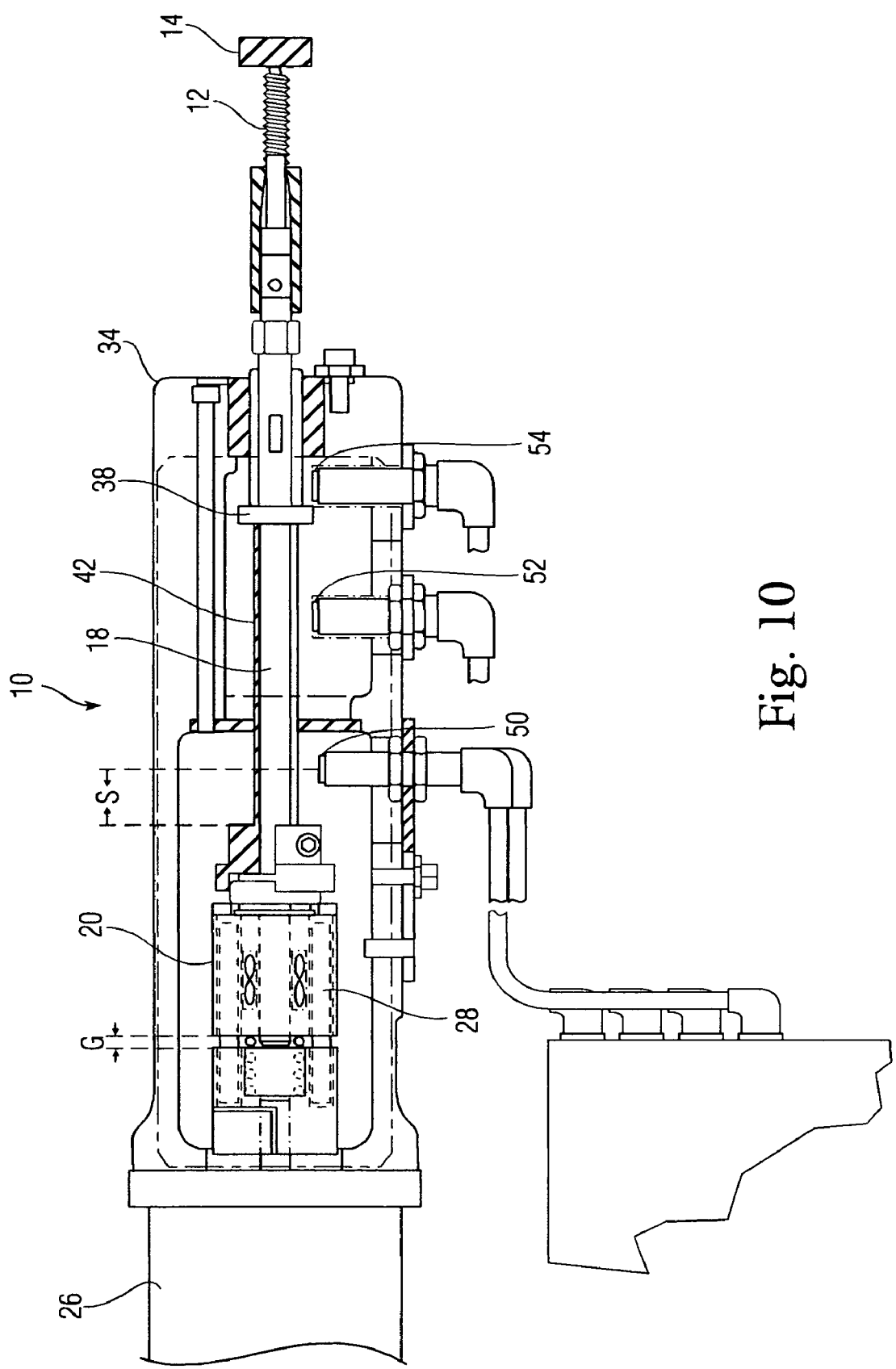
FIG. 10 is a partial cross-sectional view of the device showing the threaded gage unable to enter a non-threaded part.

In the second scenario (FIG. 9), there is an obstruction in the threaded part 14 or the threads are defective and the threaded gage 18 cannot traverse the threaded part. In this situation, the clutch 20 moves axially only a shortened distance and the gap G is smaller than if there were an unobstructed threaded part 14. The space S is not fully traversed by the clutch 20 and the first limit switch 50 is not activated. Because the threaded gage 12 is jammed in the threaded part 14, the slip portion 22 of the clutch 20 slips and the spindle 18 no longer rotates. The hollow tube 42, the lead screw 38 and the threaded gage 12 no longer rotate and do not advance axially toward the threaded part 14. The driver 44 and the clutch housing continue to rotate. The control 32 recognizes that neither the first limit switch 50 nor the second limit switch 52 have been activated and that a predetermined time has elapsed. The control 32 then reverses the direction of the motor 26. This time may be 0.5 seconds or any time determined by the nature of the threaded part 14. When the motor 26 reverses, the direct drive portion 24 of the clutch is engaged and the threaded gage 12 is disengaged from the jam in the threaded part 14. The control 32 registers a reject of the threaded part 14.

In the third scenario (FIG. 7), the threaded part 14 has no threads or is undersized and the threaded gage 12 rotates at the mouth of the hole in the threaded part 14. The spindle 18 continues to rotate but cannot advance. As long as the spindle 18 rotates, the lead screw 58 advances because it is keyed to the spindle. As a result, the lead screw 38 becomes spaced apart from one end of the hollow tube 42 or the opposite end of the hollow tube 42 becomes spaced apart from the clamp ring 44. The hollow tube 42 permits the spindle to axially advance only as fast as the lead screw 38 permits. If the spindle 18 cannot advance axially, the spindle 18 can continue to rotate but a gap will appear between one of the ends of the hollow tube 42 and the adjoining element of the device. The space S remains open and the first limit switch 50 is not activated. A third limit switch 54 is disposed within the housing 14 at a position opposite where the inner end of the lead screw 28 is located when the device is operating normally with an acceptable threaded part 14 and the lead screw 38 has had an maximum axial rotation. Thus, when the lead screw 38 has advanced to this position and the first limit switch 50 has not been activated, the third limit switch 54 is activated. The device does not impart undue force levels to the unthreaded or undersized part. The control 32 recognizes that the threaded part 14 has no threads and signals the motor 26 to reverse. The control 32 also registers a reject of the threaded part 14.

Figure 7:
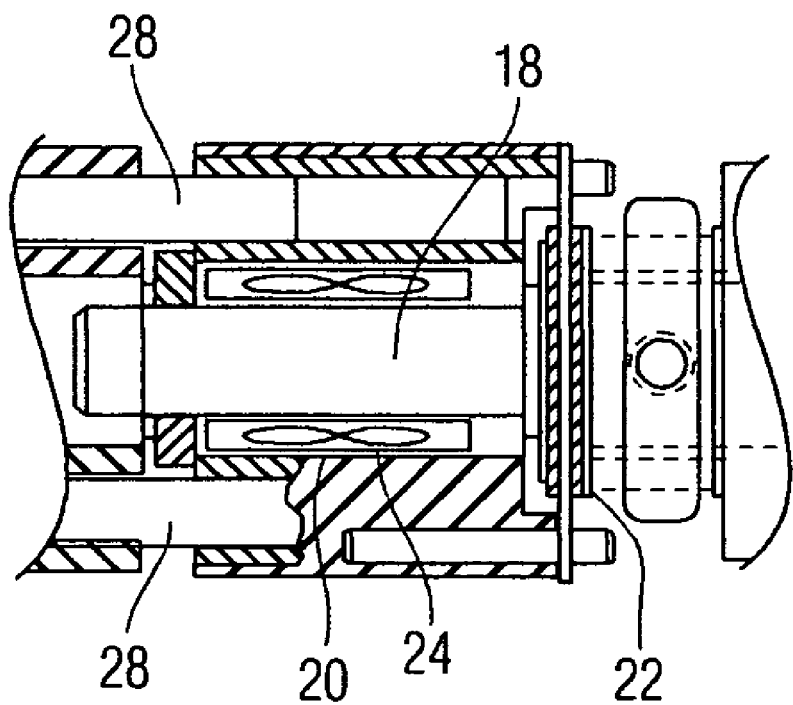
FIG. 7 is an enlarged cross-sectional view of the clutch showing the slip portion, the direct drive portion and the drive pins.
Figure 8:
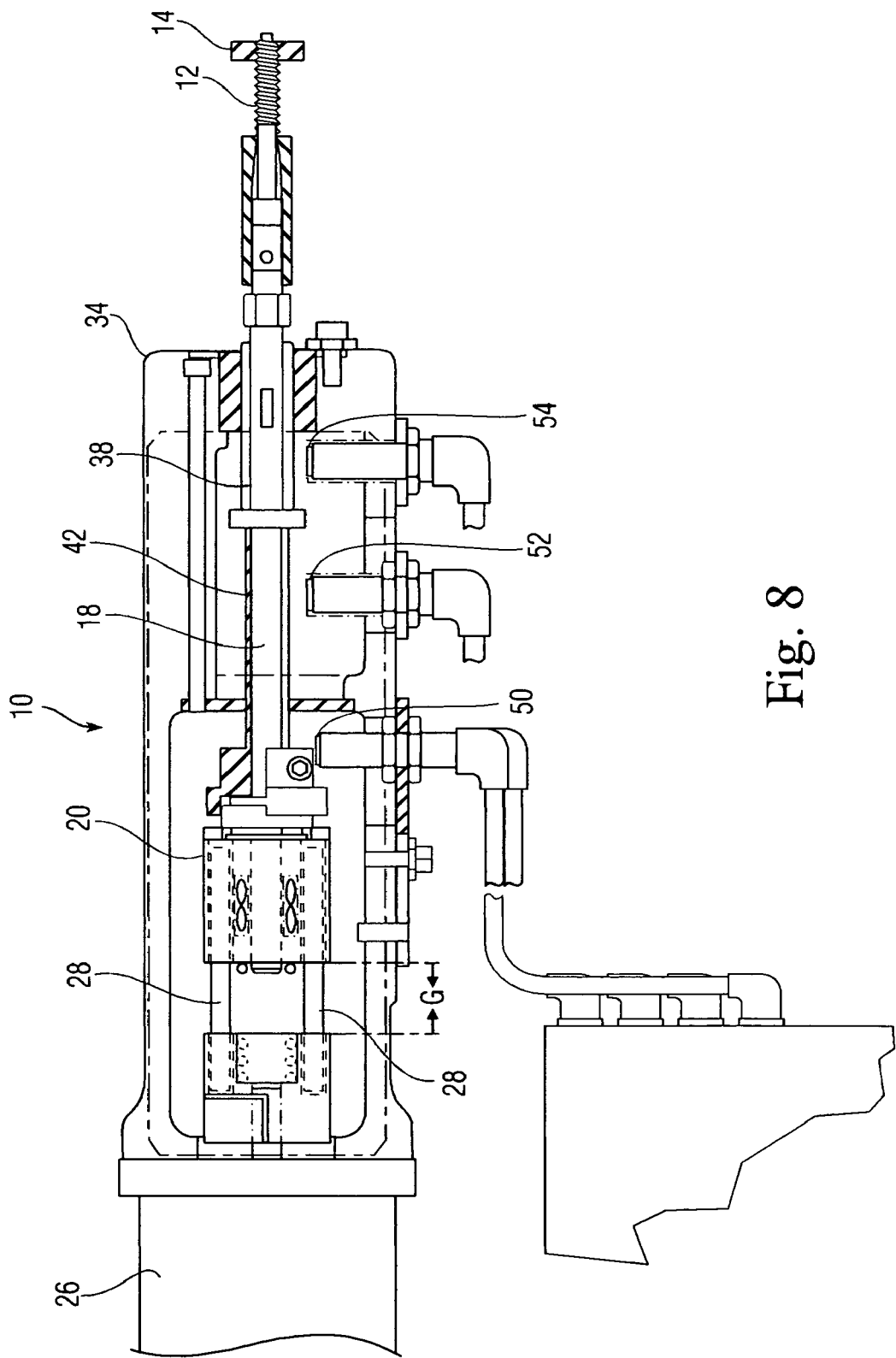
FIG. 8 is a partial cross-sectional view of the device showing the threaded gage fully engaging the threaded item.

It is important that torque be limited in driving the threaded gage 12 onto the threaded part 14 (the clutch 10 must slip easily). But in backing out, the available torque transmitted to the threaded gage 12 must be much higher. This is because the threaded gage may jam in the part, and the momentum of the high speed drive can cause it to "stick". It is for this reason that the reverse drive is configured (in the clutch 20) to provide the full torque of te motor 76. This is accomplished in the device 10 by using a sprag 24 or other type fo overrunning clutch. This overrunning clutch 24 is, of course, in parallel with the slip clutch 20 (FIG. 7).

Figure 11:
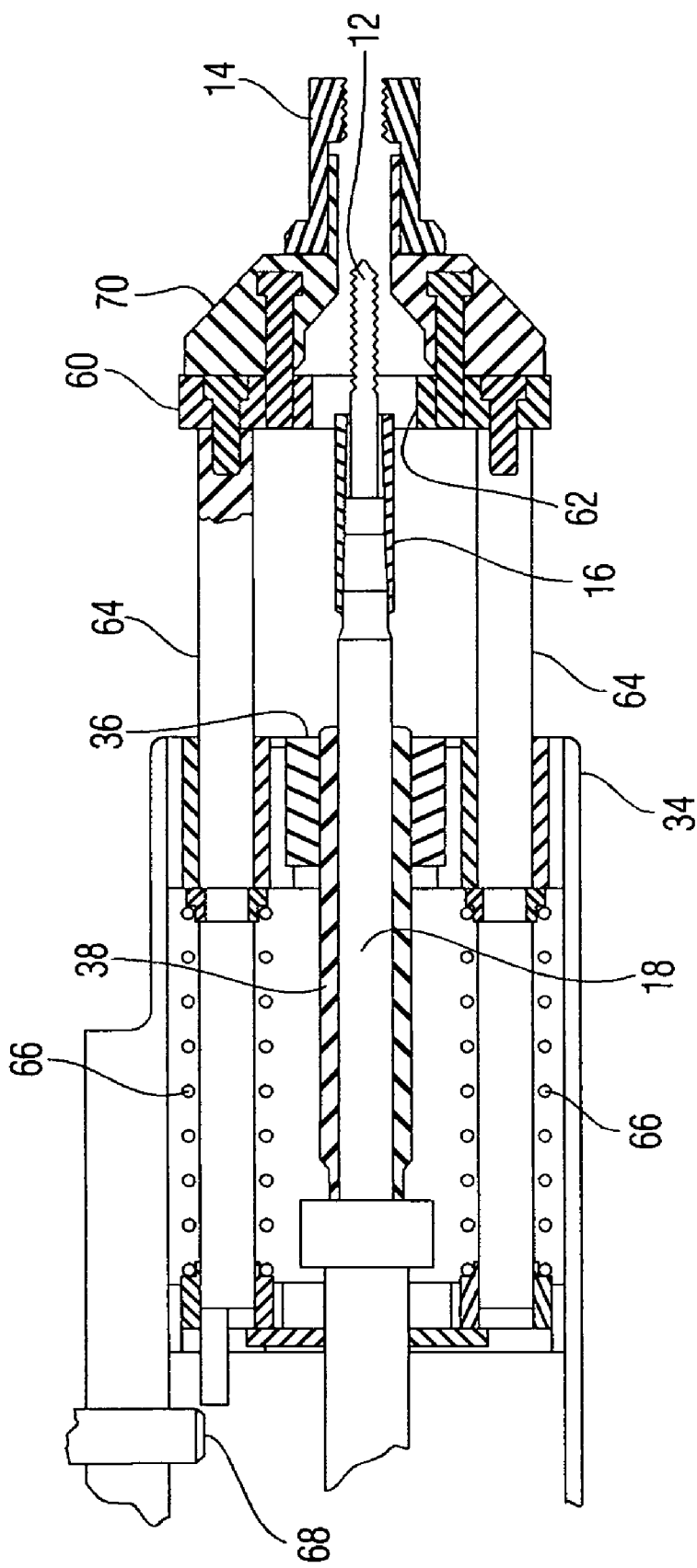
FIG. 11 is a partial cross-sectional view of a portion of the device showing a start plate

As shown in FIG. 11, the device 10 may also have a start plate 60 having an opening 62 formed therethrough. The start plate 60 is disposed around the holder 16 with the threaded gage 12 extending outwardly through the opening 62. A pair of start guide rods 64 are connected to the start plate 10. The start guide rods 64 extend into the device 10 and are parallel to the spindle 18. The start guide rods 64 are spring actuated 66 and are urged toward the threaded gage 12 such that the start plate 60 is normally spaced apart from the housing 34 of the device 10. When pressure is applied to the start plate 60 against the springs 66 such that the start plate is moved toward the housing 34, the start guide rods 64 move inwardly into the device 10. A start switch 68 is mounted within the housing 34 such that when the start guide rods 64 have been moved a predetermined distance, the start switch 68 is activated. The start switch 68 energizes the motor 26 and threaded gage 12 is rotated and driven into the threaded part 14. This mode of operation can be used for manual functioning of the device 10. If desired, special tooling 70 may be fitted to the motor surface of the start plate 60 to adapt the start plate for manual operation and to better accommodate an interface with the threaded part 14.

The device may be assembled having multiple threaded gages, spindles, clutches and motors such that high volume production of threaded parts 14 can be assured with excellent quality control. Using a six spindle device for simultaneously checking threads in six formed nuts, output levels exceeding 25,200 pieces per hour can be achieved (4,200 nuts per spindle per hour). In this type of assembly, a test cycle can be completed in less than 1.2 seconds.

The device is set up such that any threaded parts 14 which are rejected are automatically shunted to a reject box. If two successive rejects are obtained, the equipment is shut down.

Figure 12:
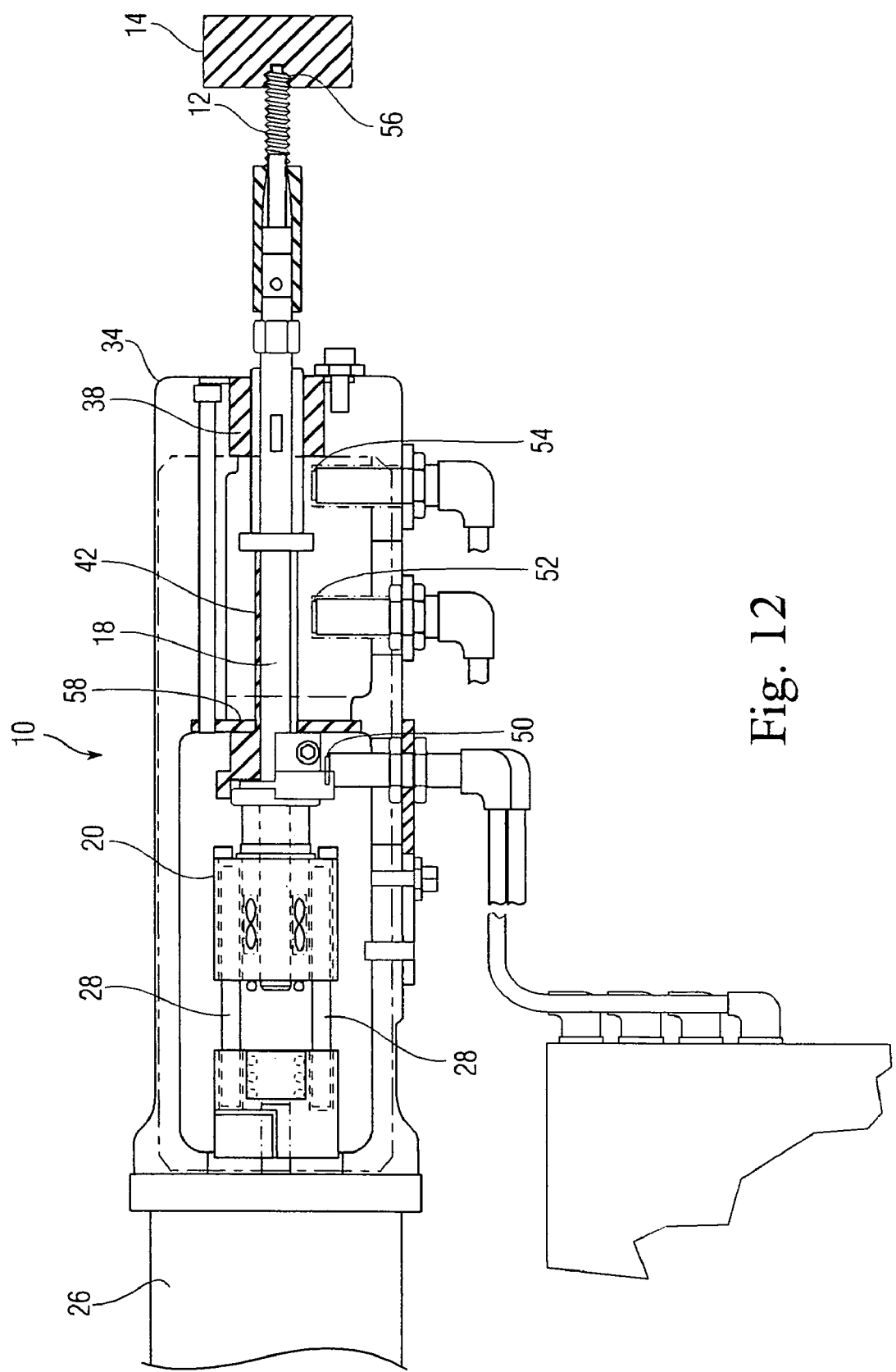
FIG. 12 is a partial cross-sectional view showing the device used with a threaded blind bore part and the clutch contacting the stall plate.
Figure 13:
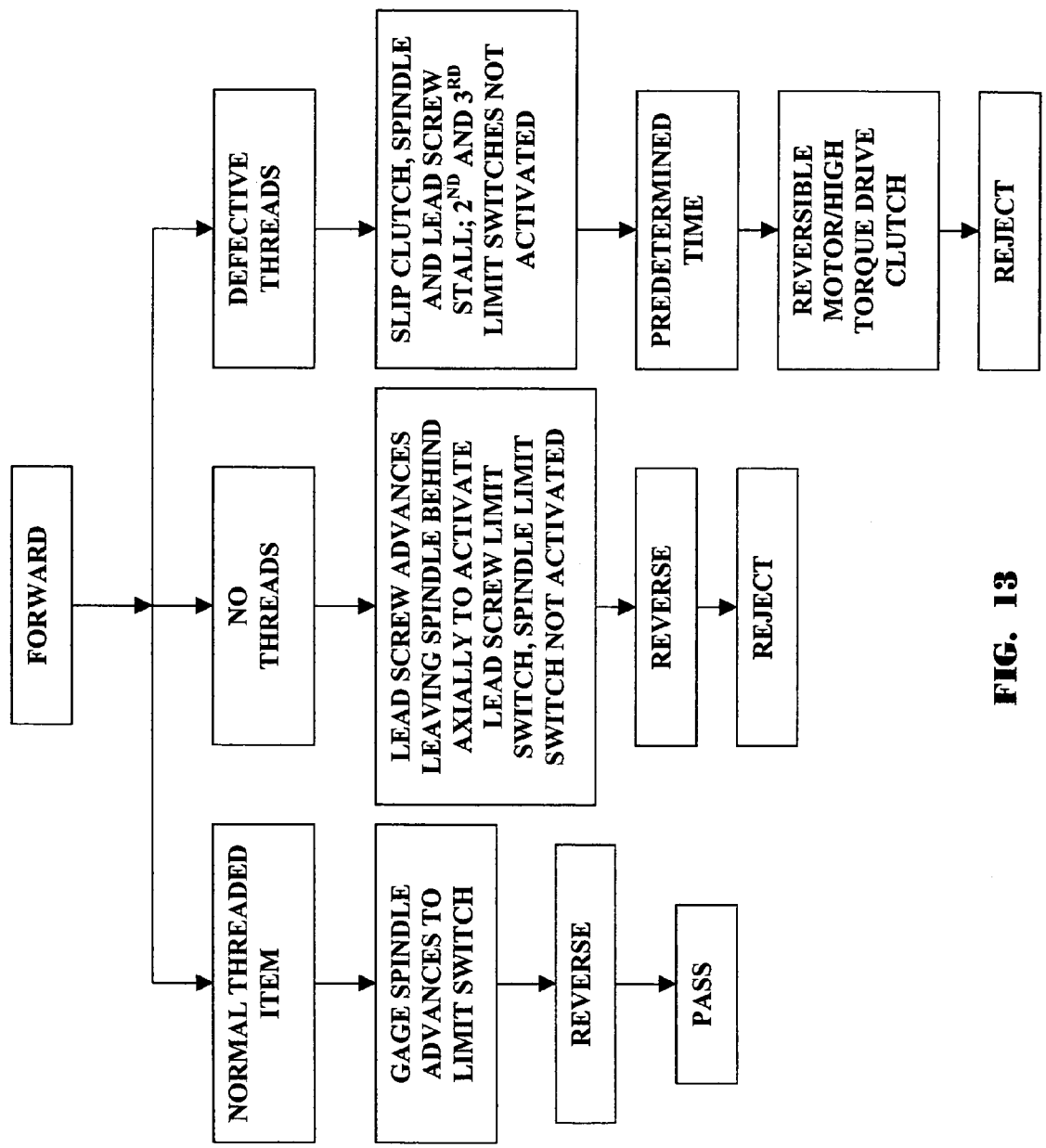
FIG. 13 is a diagram showing the operation of the device.

The present invention is also used to confirm the thread present in a part having a threaded blind bore (FIG. 12). this procedure is complicated by the need to advance the threaded gage 12 into the blind bore 56 at a high speed because of the need to test as many parts as possible in a given time. Also, the threaded gage 12 must traverse the entire depth of the length to fully test the thread in the bore 56. Thus, at the high speed, if there is a defect, the threaded gage will jam in the blind bore 56. Even if there is no defect, the very nature of the blind bore 56 is conducive to jamming if the threaded gage is unable to stop at the bottom of the blind bore 56. To address this situation, the device has a stall plate 58 which is perpendicular to the axis of rotation of the output spindle 18. The stall plate 58 is in the housing 34 around the output spindle 18 between the clutch 20 and the lead screw 38. The clutch 20 moves away from the motor 26 during the test and contacts the stall plate 58 at a predetermined distance. This stalls the motor 26 so that the threaded gage 12 will stop exactly at the same distance within the bore 56 of every threaded part 14. This predetermined distance is adjustable to accommodate blind bores of varying depths.

The limit switches 50, 52, 54 may be physical contact switches, be based on electrical capacitance or conductance or be of other types known to persons skilled in the art. If capacitance or inductance switches are used, the inner end of the lead screw 38 may be enlarged to provide more positive transmission of a signal.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A device for confirming thread presence in nuts and other threaded parts comprising:
   a threaded gage mounted on a holder,
   the holder being mounted on a first end of a spindle, the spindle being connected, through a clutch, to a fast reversing motor,
   wherein the motor very rapidly and automatically forwardly drives the spindle with limited torque to rotate the threaded gage to cooperate with and engage the aligned threaded part, the motor being very rapidly and automatically reversed with full available torque to retract the threaded gage, the clutch moving axially within the device.

2. The device of claim 1, wherein the clutch has a slip mechanism forward drive.

3. The device of claim 1, wherein the reverse drive of the motor has a high torque.

4. The device of claim 1, wherein the clutch has two portions, a slip portion for forward drive and a direct drive portion for reverse drive.

5. The device of claim 1, further comprising an urging portion connected to the spindle to move the spindle to engage the threaded part.

6. The device of claim 1, further having a lead screw mounted on the spindle, the lead screw moving axially from a starting point toward the threaded gage along the spindle when the motor rotates the spindle, two limit switches electrically connected to the motor, the first limit switch being activated when the motor has driven the clutch through a preselected distance, the first limit switch reversing the motor, and moving the lead screw axially away from the threaded gage, a second limit switch being disposed opposite the starting point of the lead screw, the second limit switch being activated when the lead screw returns to the starting point, the second limit switch stopping and reversing the motor when the threaded gage traverses the threaded part and the threaded part is acceptable.

7. The device of claim 1, having a timing mechanism connected to the motor, the timing mechanism activating the motor for reverse movement after a predetermined time to be used when the threaded gage does not traverse the threaded part.

8. The device of claim 1, wherein the motor is connected by slip joint to the clutch, the clutch moving away from the motor as the threaded gage engages the threaded part.

9. The device of claim 1, further comprising a lead screw mounted on the spindle, the lead screw moving axially along the spindle between a first position proximal to the clutch and a second position distal from the clutch, the lead screw moving to the second position when the threaded gage cannot engage the threaded part, means for detecting the presence of the lead screw at the second position, wherein the motor is reversed to withdraw the threaded gage.

10. The device of claim 1, wherein the threaded gage is replaceable with a threaded gage having a different thread size.

11. The device of claim 1, wherein the threaded part has a threaded blind bore.

12. The device of claim 1, having a reject container provided adjacent to the threaded part, wherein rejected threaded parts are received therein.

13. The device of claim 1, wherein a plurality of devices are connected together to simultaneously confirm the threaded presence in a corresponding plurality of threaded parts.

14. The device of claim 1, further having a start plate with a center opening therethrough, the start plate being disposed around the holder, the threaded gage extending outwardly through the center opening in the start plate, a pair of start guide rods connected to the start plate, the start guide rods extending parallel to the spindle into the device, the start guide rods being spring activated and being urged toward the threaded gage such that pressure on the start plate toward the device moves the start plate and the start guide rods toward the device, the start guide rods activating a start switch which starts the motor to drive the spindle.

15. A device for confirming thread presence on a threaded part comprising:
   a threaded gage connected to a motor through a clutch, the clutch driving two portions, a slip portion for forward drive engagement of the threaded gage with the threaded part and a direct drive portion for reverse drive disengagement of the threaded gage from the threaded part, the clutch moving axially within the device.

16. The device of claim 15, further comprising two limit switches electrically connected to the motor, the first limit switch being activated when the motor has driven the threaded gage through a preselected distance, the second limit switch being activated when the motor is to be stopped and reversed.

17. The device of claim 15, having a timing mechanism connected to the motor, the timing mechanism activating the motor for reverse movement after a predetermined time to be used when the threaded gage does not engage the threaded part.

18. A device for confirming thread presence in a part having a threaded blind bore comprising:
   a threaded gage mounted on a holder,
   the holder being mounted on a first end of a spindle, the spindle being connected, through a clutch, to a fast reversing motor,
   wherein the motor very rapidly forwardly drives the spindle to rotate the threaded gage to cooperate with and engage the aligned threaded blind bore,
   a stall plate formed within the device wherein the clutch is moved into contact with the stall plate stopping the motor and movement of a threaded gage and preventing jamming of the threaded gage within the threaded blind bore.

19. A method for confirming thread presence in male and female threaded parts comprising the steps of:
   providing a device having at least one threaded gage mounted on a holder, the holder being mounted on a spindle, the spindle being connected to a clutch, the clutch being driven by a motor, the motor being reversible,
   activating the motor to drive the at least one threaded gage to engage the threaded part at a high speed automated rate,
   providing at least one limit switch,
   activating the at least one limit switch based on axial movement of the clutch,
   the at least one limit switch reversing the motor and withdrawing the threaded gage from the threaded part,
   establishing inspection criteria wherein a threaded part which does not meet the inspection criteria is automatically disposed in a reject container.

20. The method of claim 19, wherein the threaded parts are run through the device at the rate of approximately 70 per minute per threaded gage.

21. A power-operated device for confirming the presence of threads in an opening in a nut, comprising a power driven rotatable threaded gage to be received in the opening in the nut, the device having a first distance measuring means to rapidly and automatically indicating the presence of cooperating threads in the opening in the nut, the device having a second distance measuring means for automatically rejecting nuts having an unthreaded opening, a defectively threaded opening and an undersized opening.

22. The device of claim 21, wherein the threaded gage rotates at the opening of a nut having an unthreaded opening or an undersized opening and the threaded gage cannot enter the opening in the nut.

23. The device of claim 21, wherein the threaded gage enters the opening of a nut having defective threads in the opening, detects the defective threads and automatically backs out of the opening in the nut by application of a high reversing torque to the threaded gage.

24. An automated device for confirming thread presence in a threaded part comprising:
   a threaded gage connected to a motor through a clutch, the clutch having a slip portion for applying controlled torque to engage the threaded gage with the threaded part, the clutch having a direct drive portion for applying maximum torque for instantly and automatically disengaging the threaded gage from the threaded part.

25. An automated machine for 100% quality-control inspection of threaded parts, comprising a threaded gage complementary to the threaded parts, a driving mechanism for alternately driving the gage forwardly into and reversibly out of the succession of threaded parts as the parts are running continuously through the machine, the driving mechanism including a slip clutch means providing a predetermined maximum limit on the torque applied to the gage going forwardly into the threaded parts; such that in the event a particular part is defective, the slip clutch means automatically permits the forward drive of the gage to stop, and means for applying substantially unlimited torque to the gage in reverse to assure that the defective part is discarded and that the machine does not jam.

26. the automated machine of claim 25, wherein the means for applying substantially unlimited torque comprises an over-running clutch.

* * * * *